Patented Nov. 13, 1951

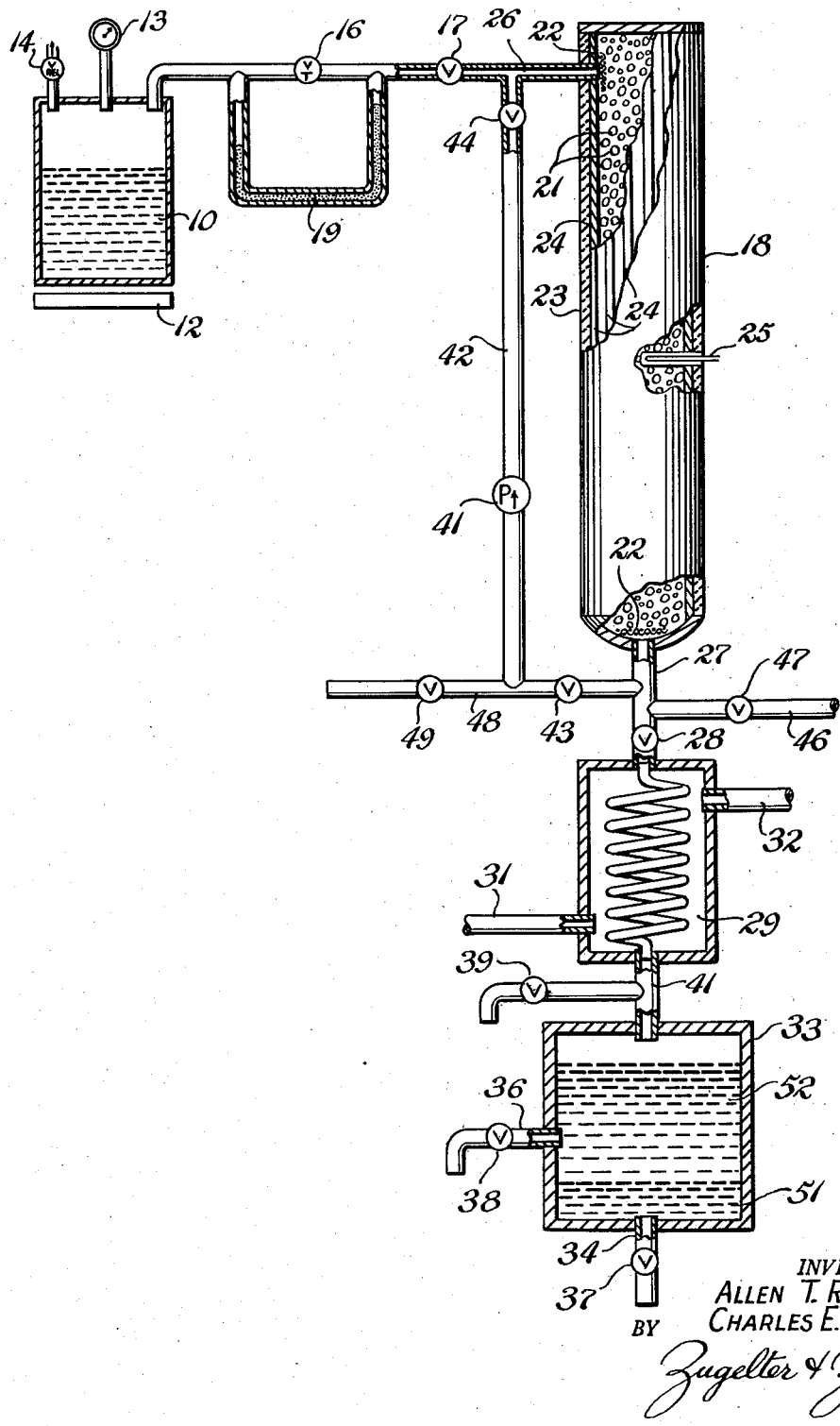

2,574,498

UNITED STATES PATENT OFFICE 2,574,498

METHOD OF DEODORIZING TERPENES

Allen T. Rooch, Cincinnati, Ohio, and Charles E. Greenlaw, Detroit, Mich.; said Greenlaw assignor to said Rooch Application September 10, 1948, Serial No. 48,728

6 Claims. (Cl. 260—675.5)

This invention relates to the deodorizing of terpenes and more particularly this invention relates to a catalytic method for treating cyclic terpenes to produce a material substantially free of objectionable odor.

Various terpenes and mixtures of terpenes have found use as solvents and in the manufacture of plastics. Further, the cyclic terpenes are valuable because they have the power to cause oxidation of many organic materials. However, the terpenes and particularly the cyclic terpenes have been found objectionable because of their odor, and it is a principal object of the present invention to provide a process by which the objectionable odor of the cyclic terpenes can be substantially reduced without sacrificing their oxidizing power or causing the development of other odors.

A further object of this invention is to provide improved terpene-like materials or modified cyclic terpenes substantially free of the characteristic odors of cyclic terpenes.

A further object of the present invention is to provide a method for preparing improved deodorized materials from cyclic terpenes.

A further object of the present invention is to provide a method for converting cyclic terpene hydrocarbons into related materials which retain the oxidizing qualities of the terpene hydrocarbons but which have substantially less odor than the cyclic terpenes.

A further object of the present invention is to produce improved deodorized materials from commercial dipentene which do not possess the characteristic odor of dipentene.

A further object of this invention is to provide improved deodorized materials from commercial turpentine which do not possess the characteristic odor of turpentine.

Briefly, the present invention is based on the discovery that when a cyclic terpene, either monocyclic or bicyclic, while in the vapor phase, is passed over a heated alumina catalyst the temperature of which is maintained above the boiling point of the terpene, the odor of the terpene is greatly reduced. If the catalyst is maintained at a temperature within the range of approximately 200° C. to 450° C. and a cyclic terpene is passed over the catalyst in the form of a vapor, the terpene undergoes a change by which its odor is greatly reduced yet its oxidizing power is not substantially changed and may in fact be increased. The lower temperature of the range is related to the boiling point of terpene at the particular pressure at which vapor is generated, the temperature of the catalyst being always higher than the boiling point of the terpene. The exact nature of the change and the mechanism of the reaction are not fully understood; but it is believed that at least in part a dehydrogenation may occur, for water is usually formed during the reaction. Catalytic deodorization is usually, though not always, accompanied by an increase in iodine value, from which it may be deduced that the reaction may result in an increase in the unsaturation of the terpene hydrocarbons as well as a dehydrogenation. However, the foregoing explanation of the reaction mechanism is given here merely as an hypothesis to help explain the results obtained, and applicant does not desire to be limited to any hypothetical explanation of the reaction by which the improved results are obtained.

As is well known, the cyclic terpenes have strong characteristic odors. For example, dipentene has a strong characteristic lemon-like odor, while turpentine has a biting odor. The modified cyclic terpene product, on the other hand, may be substantially free of the characteristic odors of the cyclic terpenes.

With the above and other features and objects in view, the invention will now be described in greater detail with reference to the accompanying drawing, in which:

The drawing illustrates schematically apparatus for carrying out the process of this invention.

A stock of cyclic terpene to be deodorized is introduced into a closed kettle 10, the kettle 10 being heated by a heating element 12 to vaporize the terpene. The kettle 10 may be provided with a pressure gauge 13 and a safety valve 14. From the kettle 10, the vaporized terpene flows through a throttle valve 16 and a control valve 17 to a catalyst chamber 18. A manometer 19 can register the drop in pressure across the throttle valve 16.

The catalyst chamber 18 may be of appropriate material such as iron or steel. The chamber 18 is packed with catalyst pellets 21. Screens 22 across the openings in the catalyst chamber prevent the catalyst pellets from falling out of the chamber. As shown at 23, the chamber may be covered with appropriate thermal insulation. Electrically heated units 24 run lengthwise of the chamber and are positioned between the insulation 23 and the walls of the chamber 18 for maintaining the catalyst pellets at an elevated temperature. The units 24 preferably are of sufficient capacity to heat the catalyst to a temperature of 650° centigrade and may be equipped with appropriate temperature regulating devices for controlling the catalyst temperature. A thermocouple 25 is a well embedded in the catalyst pellets may be used to record the temperature of the catalyst.

The terpene vapors may enter the chamber 18 at or near the upper end at an inlet line 26, leaving at the lower end of the chamber 18 through an outlet line 27. During passage of the vapors through the chamber 18, the catalyst is heated by the units 23 and maintained at a temperature above the boiling point of the terpene so that contact with the catalyst is in the vapor phase.

The outlet line 27 leads the vapors from the catalyst chamber 18 through a valve 28 to a condenser 29 where the vapors are condensed. Cooling fluid may be introduced into the condenser as at 31 and removed as at 32. Condensate from the condenser 29 may be led to a separating tank 33 in which water may be separated from the product. The separating tank 33 may be equipped with a lower discharge line 34, at which water may be removed, and a side discharge line 36, at which product may be removed. Valves 37 and 38 in the lines 34 and 36 respectively control the removal of water and product from the separating tank 33. A sampling cock 39 may be attached to a line 41 between the condenser and the separating tank for removing samples of product before the product reaches the separating tank.

During catalytic action the catalyst picks up deposits, which are largely organic in nature, from the material passing over it, and the catalyst must be reactivated periodically. Reactivation is effected by stopping the feed and heating the catalyst to a temperature of about 650° C. in a stream of air to burn off the deposits which have collected thereon. A pump 41 can force air through the catalyst mass during reactivation. The pump 41 is in a line 42 which runs between the inlet line 26 and the outlet line 27. Valves 43 and 44 in the line 42 may be opened during reactivation but are closed during catalyst operation. A bleeder line 46 attached to the line 27 and controlled by a valve 47 permits discharge of a portion of the air as it is driven through the catalyst chamber. A second bleeder line 48 controlled by a valve 49 permits entry of air during reactivation.

During use of the catalyst the valves 43, 44 and 47 are closed and the valves 17 and 28 are open. The liquid cyclic terpene in the kettle 10 is heated by the heating element 12 to vaporize the terpene. The heat may be controlled by reference to the pressure gauge 13, sufficient heat being introduced to maintain a suitable pressure in the kettle 10 for providing a proper rate of flow through the catalyst. The catalyst in the chamber 18 is heated by the heating units 24 and is maintained at a suitable temperature above the boiling point of the terpene. The vaporized terpene passes through the catalyst as a vapor, and treated vapors are condensed in the condenser 29. Condensate is caught in the separating tank 33. Any water produced during the catalytic action, collects in the bottom of the tank 33 and may be removed through the line 34. The formation of water may serve as a guide for controlling conditions of catalytic treatment, for the formation of water shows that the cyclic terpene is undergoing modification. If no water is formed or if an insufficient amount of water is formed, this is an indication that the catalyst temperature and rate of flow through the catalyst are not right. The treated terpene collects above the water and may be withdrawn through the line 36. In the drawing, water in the separating tank is indicated at 51; and treated terpene is indicated at 52. As will be understood, the apparatus may be operated with the condenser and separating tank at atmospheric pressure, or the apparatus may be operated at elevated pressure, or a vacuum may be impressed on the condenser and separating tank and the apparatus operated at a reduced pressure. If desired, the product may be passed through the catalyst chamber a second time to effect further deodorization, if required.

When the catalyst requires reactivation, the valves 17 and 28 are closed, and the valves 43 and 44 are opened. The valves 47 and 49 may be opened a sufficient amount to allow air to be bled into the line 42. Adjustment of the valve 43 can serve for control of the proportion of air being recirculated. Then the catalyst body is heated to a sufficient temperature, say 650° C., to permit the deposits on the catalyst to be burned off. Air is pumped through the catalyst by the pump 41. A portion of the air leaving the catalyst mass is recirculated, while the remainder is bled through the line 46. When the deposits have been removed, the catalyst may be used for further deodorization.

Prior catalytic processes for treatment of the cyclic terpenes have been directed to the preparation of p-cymene. Hull has reported in United States Patent No. 2,388,359 the catalytic conversion of up to 86 percent of di-pentene to p-cymene by proper choice of catalyst and reaction conditions. P-cymene itself is not of value in causing oxidation, and formation of substantial amounts thereof during catalytic treatment would lower the value of the product as an agent for causing oxidation. It has been found that the catalytic deodorization of cyclic terpenes with an alumina catalyst does not produce substantial amounts or proportions of p-cymene. In fact, spectrophotometric analysis of catalytically deodorized terpenes has shown that there may be some reduction of the amount of p-cymene which may accompany the terpenes charged to the catalyst. The present method substantially deodorizes the cyclic terpenes by modifying them in a manner which appears to be less drastic than that required to produce p-cymene.

The process not only reduces the odors of cyclic terpenes but also increases their oxidizing power. As a general rule, the treated or modified terpenes have approximately the same power for causing oxidation as the terpenes from which they are derived, but in some cases treated and relatively odorless modified terpenes have been produced which have greater power for producing oxidation than the terpenes from which they have been derived.

The catalyst may take various physical forms. It may be in the form of pellets or granules or may be suspended on an inert carrier such as pumice or coke. A preferred form of catalyst consists of pellets of activated alumina of a diameter of approximately ¼ inch to ⅜ inch. The pellets may be packed in the tube or column through which vaporized terpenes are passed.

Careful control of the temperature and time of contact with the catalyst is essential. If the terpene does not have sufficient contact with the catalyst, it is not fully deodorized. On the other hand, it has been found that if the terpene is permitted an excessive time of contact with the catalyst, it cracks and develops a burnt or gasoline-like odor. In general, at higher temperatures shorter contact times are required. The optimum temperature has been found to vary with the nature of the feed, the rate of feed, the volume of the catalyst, and the size of the catalyst particles. Once the optimum temperature is determined, variations of 20°–30° C. are not objectionable, but the closer the control, the better the results obtained. As already pointed out, temperatures within the range of about 200° C. to about 450° C. have been found most satisfactory for deodorizing cyclic terpenes. Lower temperatures between the boiling point of the terpenes and 200° C. have been employed successfully. The boiling points of the various terpenes are well-known and are reported in handbooks. Higher temperatures may also be employed, and temperatures as high as 450° C. or higher have proved useful although at higher temperatures greater care must be exercised in controlling the rate of flow in order to obtain deodorizing without causing a burnt or gasoline-like odor. At the higher temperatures, cracking of the terpenes is more noticeable showing up in the production of lower boiling fractions than were present in the original cyclic terpene. The conditions which cause cracking and the production of a gasoline-like odor do not necessarily destroy the oxidizing power, but the presence of a gasoline-like odor may be undesirable.

The rate of feed has been found to have a most pronounced effect on the deodorization. A skilled worker can easily determine the optimum rate by noting the odor of the product as it is formed. If it has a burnt odor, the rate of flow must be increased; while if it retains the odor of the feed, the rate of flow must be reduced. In general, a feed rate of from 5 to 15 gallons per hour per 100 pounds of catalyst has been found to give good results with a catalyst having an average particle diameter of ⅜ inch in the temperature range of 200° C. to 400° C.

The catalyst is preferably used in the form of coarse particles or pellets. An average pellet diameter of ⅛ inch to ½ inch has been found most suitable. Larger pellets may be used, but larger quantities of catalyst are required with larger catalyst particles. A catalyst in the form of smaller grains has given less satisfactory results, but the invention is not necessarily to be limited to the preferred catalyst pellet size.

The cyclic terpenes which form the raw material for the process of this invention may be obtained from any suitable source. It is not necessary that the cyclic terpenes be pure, and mixtures of various terpenes and also commercial terpenes, which consist of mixtures of terpenes together with related materials, may be deodorized by the process of this invention. Commerical dipentene, which is available in considerable quantities, may be deodorized to yield a material having substantially less odor than dipentene. The characteristic odor of gum or wood turpentine, which consist essentially of alpha-pinene, can similarly be greatly reduced by the method of this invention.

The deodorizing effect is produced at temperatures and flow rates which produce neither substantial proportions of p-cymene nor substantial proportions of low boiling materials which may be produced by more drastic conditions of slower flow rate and higher temperature.

The following examples illustrate the process and product produced thereby, in greater detail, but it is to be understood that the examples are given primarily by way of illustration and that the invention is not intended to be limited thereby except as set out in the appended claims.

*Example I*

A tube of molybdenum steel of 7⅝ inches inside diameter, about 44 square inches in area, was packed with 100 pounds of granules or pellets of activated alumina catalyst having an average diameter of ⅜ inch. The pellets filled a length of approximately 9 feet of the tube. The catalyst was heated to and maintained at a temperature of 240° C. to 290° C. by means of electrical heating units surrounding the tube.

Commercial di-pentene, which has a strong lemon-like odor, containing approximately 25.6 percent p-cymene by weight was vaporized, and the vaporized di-pentene was passed through the catalyst and condensed on leaving the catalyst at a rate of from 2.5 to 10.2 gallons of condensate per hour. The modified di-pentene collected as condensate had only a faint lemon-like odor when measured at the threshold of perception. Spectrophotometric analysis showed that it contained 25.0 percent p-cymene by weight.

*Example II*

A second sample of the commercial di-pentene employed in Example I was vaporized and the vaporized di-pentene was passed through the catalyst and tube employed in Example I. The catalyst was heated to a temperature of approximately 270° C. to 273° C. and the modified di-pentene was condensed on leaving the catalyst at a rate of approximately 6.5 to 8 gallons per hour of condensate. The condensate had only a faint lemon-like odor. Spectrophotometric analysis showed that it contained approximately 28 percent p-cymene by weight.

*Example III*

A third sample of the commercial di-pentene employed in Example I was vaporized and the vaporized di-pentene was passed through the catalyst and tube employed in Example I. The catalyst was heated to a temperature of approximately 284° C. to 300° C. and treated or modified di-pentene was condensed on leaving the catalyst to yield approximately 7.5 to 9 gallons of condensate per hour. The modified di-pentene condensate had only a slight lemon-like odor. Spectrophotometric analysis showed that it contained 29.0 percent p-cymene by weight.

*Example IV*

A sample of commercial di-pentene containing 25.6 percent p-cymene by weight was vaporized and the vaporized di-pentene was passed through a catalyst of pellets similar to those employed in Example I. Instead of a molybdenum steel tube, the catalyst was held in an iron catalyst tube of one inch inside diameter 24 inches long. The tube contained approximately 16 cubic inches of catalyst pellets. The catalyst was heated to a temperature of approximately 325° C. The modified di-pentene collected as condensate had only a slight lemon-like odor. Spectrophotometric analysis showed that it contained approximately 16 percent p-cymene by weight, a reduction in the proportion of p-cymene.

*Example V*

A second sample of the commercial di-pentene used in Example IV was passed through the catalyst and tube employed in Example IV, the catalyst being maintained at a temperature of approximately 400° C. The modified di-pentene collected as condensate was free of the lemon-like odor but had a faint or slight gasoline-like odor. The content of p-cymene was 23 percent by weight, a reduction of the original p-cymene content.

*Example VI*

A third sample of the commercial di-pentene used in Example IV was passed through the catalyst and tube employed in Example IV, the catalyst being maintained at a temperature of approximately 450° C. The modified di-pentene collected as condensate was free of the lemon-like odor but had a faint or slight gasoline-like odor. The p-cymene content was 27.5 percent. by weight, a slight increase in p-cymene content.

*Example VII*

Commercial wood turpentine was vaporized and the vaporized turpentine was passed through the catalyst and tube employed in Example I. The catalyst was heated to a temperature of 220 to 320° C. The treated or modified turpentine was condensed on leaving the catalyst at a rate of approximately 6 to 12 gallons per hour. The condensate had only a slight or faint odor characteristic of wood turpentine.

What is claimed is:

1. A method of modifying commercial cyclic terpenes of the group consisting of commercial dipentene and commercial turpentine to substantially deodorize the same from an obnoxious to a relatively pleasant odor, said terpenes containing a substantial amount of p-cymene, said method consisting in heating a commercial terpene of said group to its vaporizing temperature, passing the vaporized terpene of said group through a catalyst bed consisting of alumina pellets having an average diameter of about one-fourth (¼) to three-eighths (⅜) of an inch, heating said catalyst bed to a temperature above the temperature of said vapor and within the range of about 200° C. to 450° C., maintaining the pressure of the vapor of the terpene of said group at the point where it enters such catalyst bed at such a value that the rate of flow of said vapor on a liquid basis through the bed is maintained between about 2.5 to 15 gallons per hour per one hundred (100) pounds of catalyst, discharging the vapor from said catalyst bed, condensing the discharged vapor, and so adjusting the temperature of the catalyst bed relative to the rate of flow of vapor therethrough that the condensate consists of water and a modified terpene of said group containing substantially the same amount of p-cymene as the untreated terpene.

2. A method of modifying commercial di-pentene containing a substantial proportion of p-cymene to substantially deodorize the same from an obnoxious to a relatively pleasant odor, that consists in heating a commercial dipentene to its vaporizing temperature, passing the vaporized dipentene through a catalyst bed consisting of alumina pellets having an average diameter of about one-fourth (¼) to three-eighths (⅜) of an inch, heating said catalyst bed to a temperature above the temperature of said vapor and within the range of about 200° C. to 450° C., maintaining the pressure of the dipentene vapor at the point where it enters such catalyst bed at such a value that the rate of flow of said vapor on a liquid basis through the bed is maintained between about 2.5 to 15 gallons per hour per one hundred (100) pounds of catalyst, discharging the dipentene vapor from said catalyst bed, condensing the discharged vapor, and so adjusting the temperature of the catalyst bed relative to the rate of flow of vapor therethrough that the condensate consists of water and modified dipentene containing substantially the same proportion of p-cymene as the untreated dipentene.

3. A method of modifying commercial turpentine to substantially deodorize the same from an obnoxious to a relatively pleasant odor, that consists in heating a commercial turpentine containing a substantial proportion of p-cymene, to its vaporizing temperature, passing the vaporized turpentine through a catalyst bed consisting of alumina pellets having an average diameter of about one-fourth (¼) to three-eighths (⅜) of an inch, heating said catalyst bed to a temperature above the temperature of said vapor and within the range of about 200° C. to 450° C., maintaining the pressure of the turpentine vapor at the point where it enters such catalyst bed at such a value that the rate of flow of said turpentine vapor on a liquid basis through the bed is maintained between about 2.5 to 15 gallons per hour per one hundred (100) pounds of catalyst, discharging said vapor from said catalyst bed, condensing the discharged vapor, and so adjusting the temperature of the catalyst bed relative to the rate of flow of said vapor therethrough that the condensate consists of water and modified turpentine containing substantially the same proportion of p-cymene as the untreated turpentine.

4. A method according to claim 1 characterized by the fact that the pressure of the vapor ahead of the catalyst bed is maintained at a value sufficient to cause the vapor to flow at a rate on a liquid basis of 2.5 to 15 gallons per hour through a catalyst bed having a depth of approximately nine feet and an area in cross section of approximately forty-four square inches.

5. A method according to claim 2 characterized by the fact that the pressure of the vapor ahead of the catalyst bed is maintained at a value sufficient to cause the vapor to flow at a rate on a liquid basis of 2.5 to 15 gallons per hour through a catalyst bed having a depth of approximately nine feet and an area in cross section of approximately forty-four square inches.

6. A method according to claim 3 characterized by the fact that the pressure of the vapor ahead of the catalyst bed is maintained at a value sufficient to cause the vapor to flow at a rate on a liquid basis of 2.5 to 15 gallons per hour through a catalyst bed having a depth of approximately nine feet and an area in cross section of approximately forty-four square inches.

ALLEN T. ROOCH.
CHARLES E. GREENLAW.

REFERENCES CITED

The following references are of record in the file of this patent:

UNITED STATES PATENTS

| Number | Name | Date |
|--------|------|------|
| 999,667 | Montaland | Aug. 1, 1911 |
| 1,091,276 | Bergs | Mar. 24, 1914 |
| 1,691,065 | Humphrey | Nov. 13, 1928 |
| 1,691,067 | Humphrey | Nov. 13, 1928 |
| 2,400,012 | Littmann | May 7, 1946 |

OTHER REFERENCES

Richter, Chemistry of the Carbon Compounds, vol. II (Nordeman Publishing Co., New York, 1939), page 209.